(12) United States Patent
Hewitt

(10) Patent No.: US 6,782,976 B2
(45) Date of Patent: Aug. 31, 2004

(54) BRAKE AND WHEEL ASSEMBLY

(75) Inventor: Timothy Hewitt, Pleasant Ridge, MI (US)

(73) Assignee: HTC Products, Inc., Royal Oak, MI (US)

( * ) Notice: Subject to any disclaimer, the term of this patent is extended or adjusted under 35 U.S.C. 154(b) by 0 days.

(21) Appl. No.: 10/609,047

(22) Filed: Jun. 27, 2003

(65) Prior Publication Data

US 2004/0112686 A1 Jun. 17, 2004

Related U.S. Application Data

(60) Provisional application No. 60/392,247, filed on Jun. 28, 2002.

(51) Int. Cl.$^7$ .................................... B62B 5/04
(52) U.S. Cl. ............................ 188/29; 188/19
(58) Field of Search .................. 188/19, 20, 29, 188/1.12; 16/35 R; 280/33.994

(56) References Cited

U.S. PATENT DOCUMENTS

| | | |
|---|---|---|
| 141,236 A | 7/1873 | Robertson |
| 918,636 A | 4/1909 | Young |
| 1,428,932 A | 9/1922 | Bayer |
| 1,555,839 A | 10/1925 | Fries et al. |
| 1,863,349 A | 6/1932 | Noeling et al. |
| 2,138,433 A | 11/1938 | Sunden |
| 2,484,094 A | 11/1949 | Jackson |
| 2,494,696 A | 1/1950 | Forbes |
| 2,512,941 A | 6/1950 | Johnson |
| 2,572,548 A | 10/1951 | Weisz et al. |
| 2,707,794 A | 5/1955 | Kramcsak, Jr. |
| 2,709,828 A | 6/1955 | Noelting et al. |
| 2,905,275 A | 9/1959 | Kostolecki et al. |
| 2,915,775 A | 12/1959 | Skupas |
| 2,972,163 A | 2/1961 | Ross et al. |
| 3,066,764 A | 12/1962 | Clinton et al. |
| 3,283,851 A | 11/1966 | Smith |
| 3,298,467 A | 1/1967 | Darnell |
| 3,467,981 A * | 9/1969 | Peter .......................... 16/35 R |
| 3,493,085 A | 2/1970 | Libhart |
| 3,534,978 A | 10/1970 | Stanfield |
| 3,772,733 A | 11/1973 | Stosberg et al. |
| 3,881,216 A | 5/1975 | Fontana |
| 3,890,669 A | 6/1975 | Reinhards |
| 3,942,608 A | 3/1976 | Frank et al. |
| 3,985,208 A | 10/1976 | Libhart |
| 4,114,232 A | 9/1977 | Umeda |
| 4,128,144 A | 12/1978 | Vassar |
| 4,212,092 A | 7/1980 | Ferrari |
| 4,248,445 A | 2/1981 | Vassar |
| 4,276,962 A | 7/1981 | Aulik |
| 4,336,630 A * | 6/1982 | Page .......................... 16/35 R |
| 4,349,937 A * | 9/1982 | Fontana ..................... 16/35 R |
| 4,360,951 A | 11/1982 | Bucher |
| 4,449,268 A | 5/1984 | Schnuell |
| 4,453,287 A | 6/1984 | Kassai |
| 4,494,272 A | 1/1985 | Morita |
| 4,821,369 A | 4/1989 | Daniels |
| 4,835,815 A | 6/1989 | Mellwig et al. |
| 4,870,715 A | 10/1989 | Schnuell |
| 5,002,163 A | 3/1991 | Kidd |

(List continued on next page.)

FOREIGN PATENT DOCUMENTS

| | | |
|---|---|---|
| DE | 33 46 722 C1 | 6/1985 |
| FR | 2 504 066 | 10/1982 |

*Primary Examiner*—Chris Schwartz
(74) *Attorney, Agent, or Firm*—Howard & Howard

(57) ABSTRACT

A brake and wheel assembly featuring a brake band and an actuator capable of being moved between first and second braking positions. The brake band is carried by a support and is suspended tangentially across the surface of a wheel. The wheel is rotatably supported on an axle. The actuator is supported in the assembly, and applies a tangential force on the brake band so that first and second braking surfaces on the brake band frictionally engage the actuator in the respective first and second braking positions.

18 Claims, 5 Drawing Sheets

U.S. PATENT DOCUMENTS

| | | | |
|---|---|---|---|
| 5,012,550 A | * | 5/1991 | Schlosser .................... 16/35 R |
| 5,236,066 A | * | 8/1993 | O'Neal et al. ............. 188/1.12 |
| 5,328,000 A | | 7/1994 | Rutter et al. |
| 5,390,942 A | | 2/1995 | Schuster et al. |
| 5,402,864 A | * | 4/1995 | Block et al. .................. 188/19 |
| 5,497,856 A | | 3/1996 | Block et al. |
| 5,511,805 A | | 4/1996 | McGrath |
| 5,566,788 A | | 10/1996 | Smith et al. |
| 5,628,386 A | * | 5/1997 | England .................... 188/1.12 |
| 5,802,668 A | | 9/1998 | Gosselin |
| 5,829,096 A | | 11/1998 | Perry |
| 6,223,864 B1 | | 5/2001 | Phelps et al. |
| 6,286,184 B1 | | 9/2001 | Dean et al. |
| 6,286,630 B1 | | 9/2001 | Obergfell |
| 6,286,632 B1 | * | 9/2001 | Chai ........................... 188/29 |
| 6,463,508 B1 | | 10/2002 | Wolf et al. |
| 6,532,624 B1 | | 3/2003 | Yang |
| 2002/0093155 A1 | | 7/2002 | Scott |

* cited by examiner

BRAKE AND WHEEL ASSEMBLY

CROSS-REFERENCES TO RELATED APPLICATIONS

This application claims priority to U.S. provisional patent application No. 60/392,247, which was filed with the United States Patent and Trademark Office on Jun. 28, 2002.

BACKGROUND OF THE INVENTION

1. Field of the Invention

The subject invention relates to a brake and wheel assembly for a manually operated cart, wagon, or the like, used to move heavy articles across a floor or other surface.

2. Description of the Related Art

Various devices exist in the art for applying a brake against a wheel to impede or arrest rotational movement of the wheel relative to the axle upon which the wheel is mounted. Such devices typically include a brake band having one end mounted on a wheel support adjacent the wheel. The other end of the brake band is moved by the actuator between a single brake-applying position in which the brake band engages the wheel to frictionally resist movement of the wheel, and an unlocked position in which the actuator releases the brake band so that it moves away from the wheel, which in turn allows the wheel to rotate freely about the axle.

Although prior wheel and brake assemblies have been successfully used on manually-operated carts, no brake and wheel assembly exists that is easy to operate and is specifically intended for use on low-profile carts upon which heavy machinery is permanently carried. Such carts are used to move heavy, cumbersome power tools or machines that would otherwise remain in a stationary position on a floor in a shop during use. In those shops in which floor space is limited, each machine is placed on one of the carts and remains there regardless of whether the machine is in storage or in use. The low profile of the cart permits the machine to be easily accessed for use; however, because the machine remains on the cart during use, sudden movement of the cart may compromise efficient operation of the machine.

Low profile carts need effective braking systems to keep the carts from inadvertently moving. While certain prior brake assemblies successfully prevent a wheel from rotating, such assemblies are ill-suited for use on low-profile or other carts because the assembly must be manipulated by hand or foot to force a lever or turn a threaded shaft to ensure that a brake-applying surface engages one of the cart's wheels to prevent the cart from moving. An example of one such brake assembly is disclosed in U.S. Pat. No. 4,035,864 ("Schröeder"). The Schröeder brake assembly features a foot-operated control lever with an expanding toggle pivotally mounted in a socket of a spring-loaded locking rocker. Although the Schröeder brake assembly can be effectively used to decelerate a moving wheel, the locking rocker used in the device has only one surface capable of engaging the tire of a running wheel, and that surface is placed in only one brake-applying position to decelerate movement of the wheel. Furthermore, because the locking rocker is completely enclosed within the cavity of a caster fork, no reliable visual indicia are in place to effectively indicate whether the control lever has successfully moved the locking rocker between the single brake-applying position and a released position away from the wheel.

Prior brake and wheel assemblies are incapable of being placed in more than one brake-applying position, and lack adequate means for determining with any degree of specificity whether the brake utilized in the assembly is actually in that brake-applying position. Thus, there remains an opportunity for a brake and wheel assembly featuring multiple brake surfaces capable of being placed in a plurality of brake-applying positions.

BRIEF SUMMARY OF THE INVENTION AND ADVANTAGES

The invention provides a brake and a wheel assembly, wherein a wheel is rotatably supported on an axle and a brake band is supported tangentially across the wheel. An actuator is movably supported for movement between first and second brake-applying positions to engage the brake band with the wheel in either of the first or second brake-applying positions.

Accordingly, the subject invention overcomes the limitations of the related art by providing a brake and wheel assembly featuring a brake band that is capable of being moved between first and second braking positions. This is achieved by suspending the brake band tangentially across the surface of a wheel and using a pivotally mounted actuator to apply a tangential force on the brake band so that first and second braking surfaces on the brake band frictionally engage the actuator in the respective first and second braking positions.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
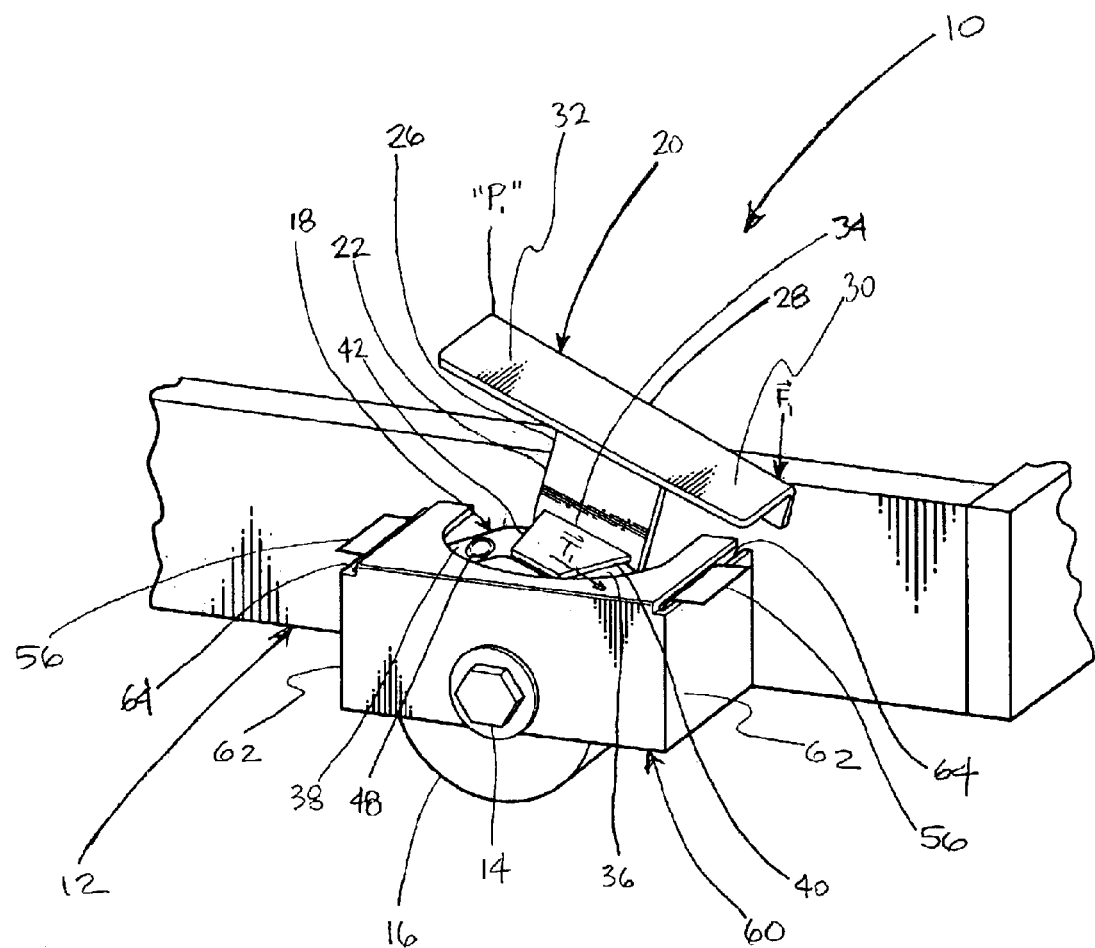
FIG. 1 is a fragmentary perspective view of a brake and wheel assembly according to the present invention with the actuator in a first brake-applying position.
Figure 2:
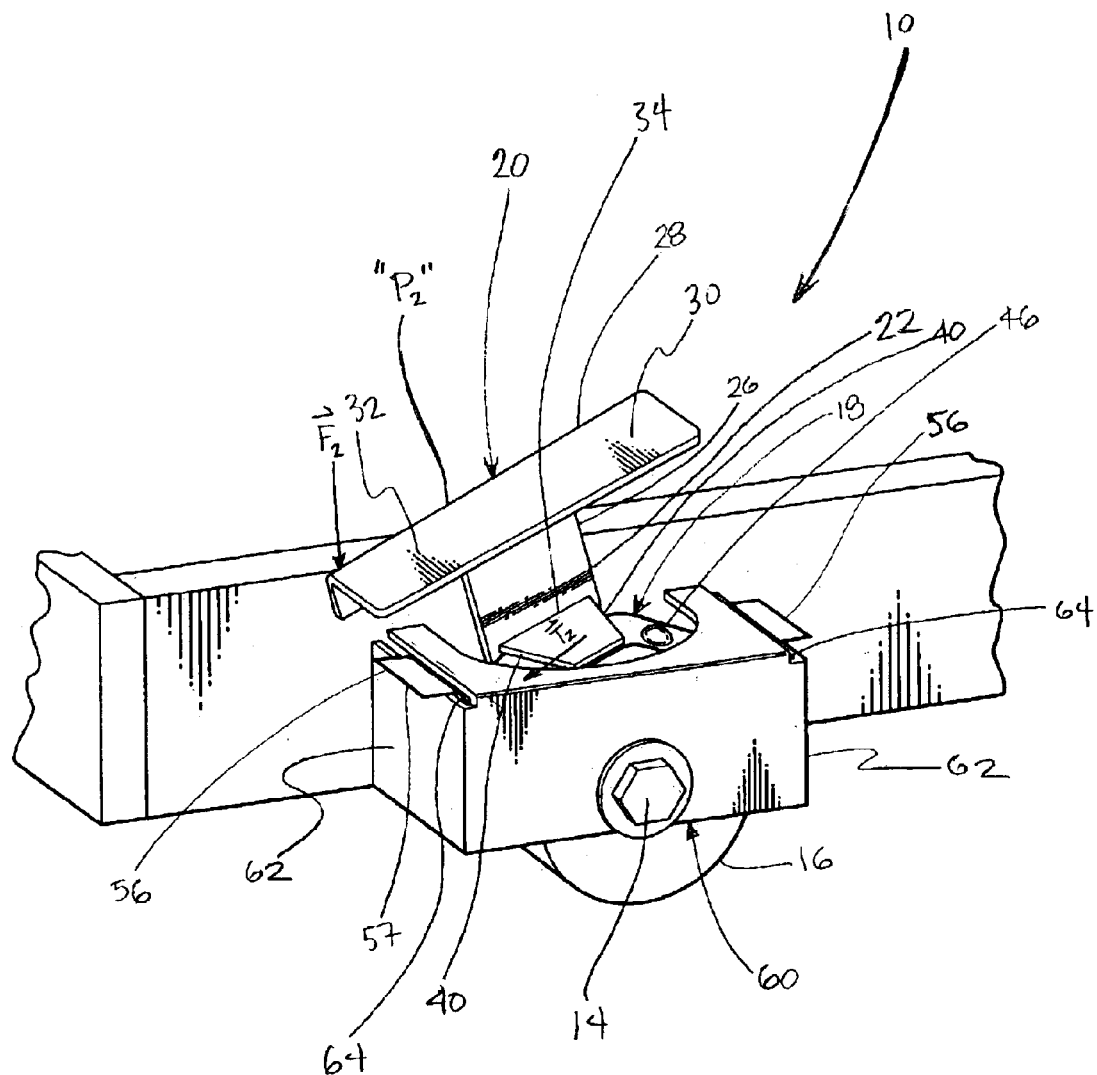
FIG. 2 is a fragmentary perspective view of a brake and wheel assembly according to the present invention with the actuator in a second brake-applying position.
Figure 3:
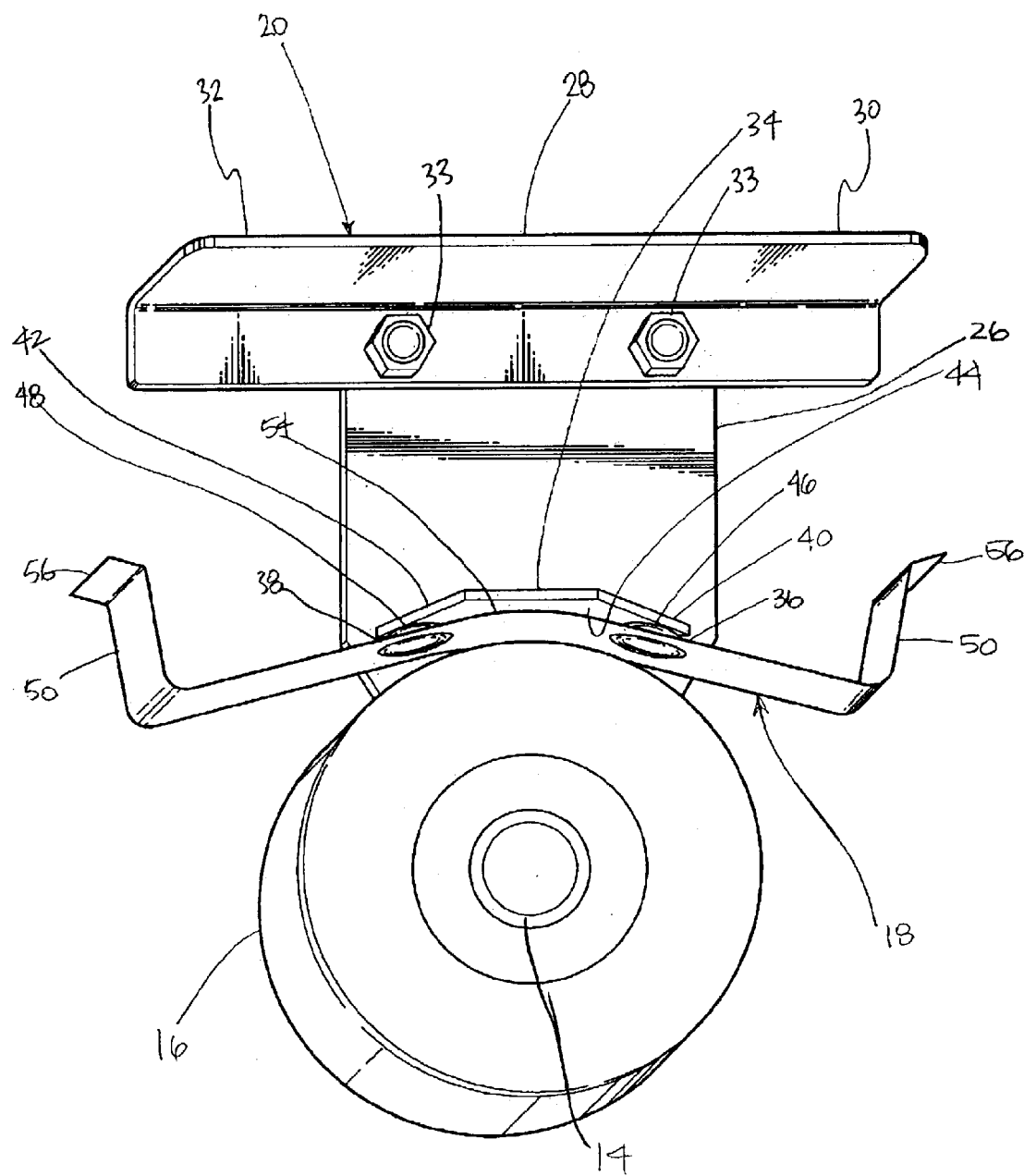
FIG. 3 is a perspective view of the actuator, brake band and wheel of a brake and wheel assembly according to the present invention.
Figure 4:
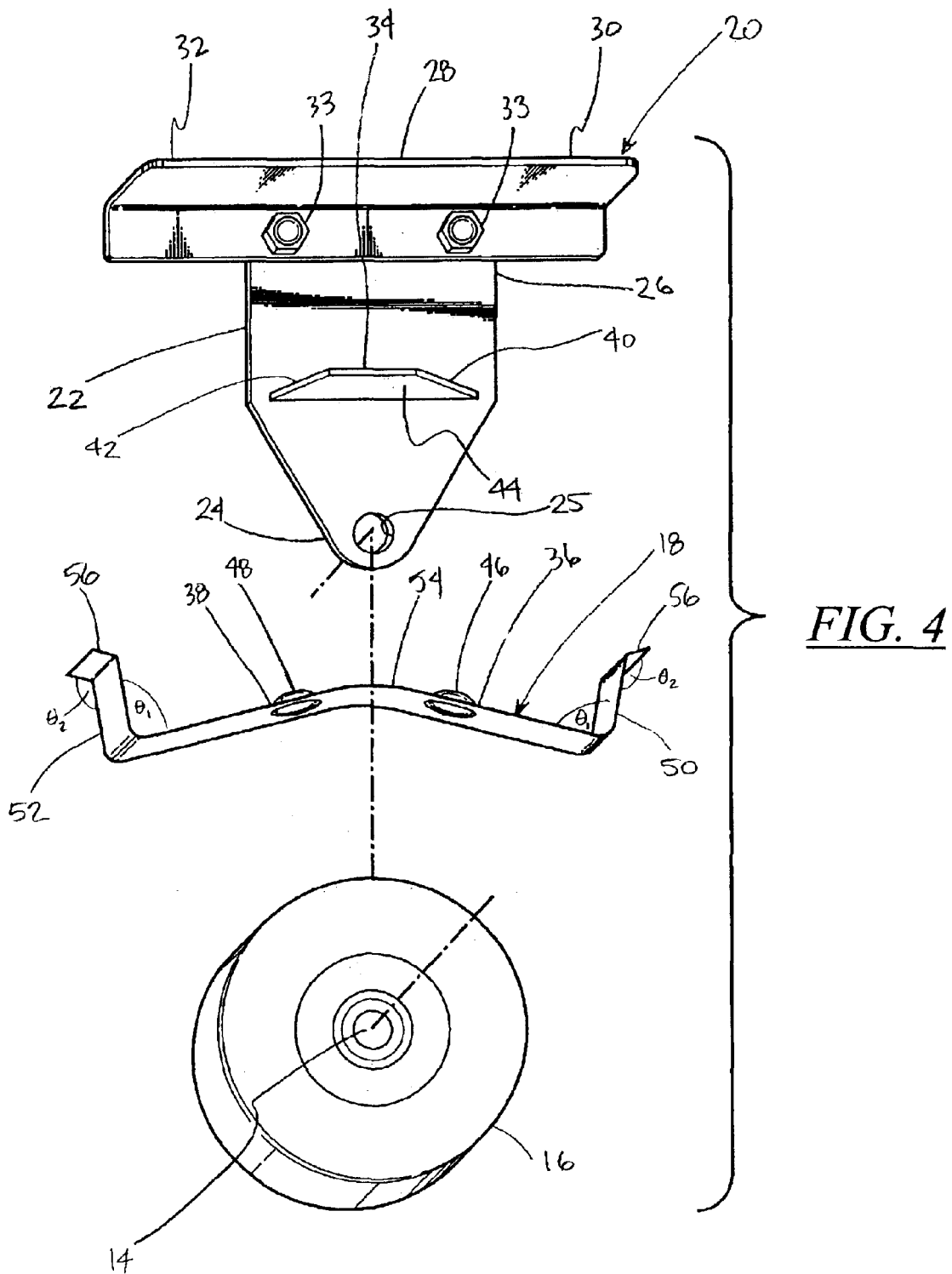
FIG. 4 is an exploded perspective view of the actuator, brake band, and wheel.

Referring to the Figures, wherein like numerals indicate like or corresponding parts throughout the several views, a brake and a wheel assembly is generally shown at 10 in FIG. 1. The assembly 10 includes a support 12, and an axle 14 is supported by the support 12. A wheel 16 is rotatably supported on the axle 14 for rotation relative thereto. A brake band 18 is supported by the support 18 to extend tangentially across the wheel 16.

The assembly 10 also includes an actuator 20. The actuator 20 is supported in the assembly 10 by the axle 14 for movement between first and second brake-applying positions, "$P_1$" and "$P_2$", to engage the brake band 18 and the wheel 16 in either of the first or second brake-applying positions "$P_1$" and "$P_2$". The actuator 20 has a pivot arm 22 with a proximal end 24 that includes a bore 25 for pivotally connecting the actuator 20 for pivotal movement relative thereto. The pivot arm 22 also has a distal end 26 that extends radially from the proximal end 24.

A pedal 28 is carried by the distal end 26 for moving the actuator 20 between the first and second brake-applying positions, "$P_1$" and "$P_2$". The pedal 28 includeds first and second lever portions 30 and 32, respectively. The distal end 26 is connected to the pedal 28 intermediate the first and second lever portions 30 and 32 by bolts 33 so that the lever portions 30 and 32 extend transversely away from the pivot arm 22 at a generally perpendicular angle thereto. As described in greater detail below, the manner in which the first lever portion 30 extends from the pivot arm 22 permits the first lever portion 30 to receive a downwardly-directed force "$F_1$" to initiate clockwise pivotal movement of the pivot arm 22 relative to the axle 14 to move the actuator 20 to the first brake-applying position "$P_1$". The second lever portion 32 receives a similar downwardly-directed force "$F_2$" to initiate counterclockwise pivotal movement of the pivot arm 22 relative to the axle 14, which moves the actuator 20 to the second brake-applying position "$P_2$".

The actuator 20 also includes a shoulder or tab 34 connected to and extending away from the pivot arm 22 between the pedal 28 and the proximal end 24. The shoulder 34 selectively engages a first braking surface 36 and a second braking surface 38 on the brake band 18. The first braking surface 36 is interposed between the actuator 20 and the wheel 16 to engage the actuator 20 in the first brake-applying position "$P_1$". The second braking surface 38 is also interposed between the actuator 20 and the wheel 16. However, the second braking surface 38 is positioned in spaced relation to the first braking surface 36 for engaging the actuator 20 in the second brake-applying position "$P_2$".

The shoulder 34 has first and second opposing ends 40 and 42, and extends transversely away from the pivot arm 22 at a generally perpendicular angle "$\theta$" thereto. An interior surface 44 extends between the first and second opposing ends 40 and 42 for engaging the brake band 18 in either of the first or second braking position "$P_1$" or "$P_2$".

The brake band 18 is interposed between the interior surface 44 of the shoulder 34 and the wheel 16. The first braking surface 36 includes a first detent 46 that extends from the brake band 18 toward the shoulder 34. The detent 46 is used to engage the interior surface 44 of the shoulder 34 adjacent the first end 40, which in turn places the actuator 20 in the first brake-applying position "$P_1$". A second detent 48 extends from the brake band 18 toward the shoulder 34 and engages the interior surface 44 of the shoulder 34 adjacent the second end 40 when the actuator 20 is in the second brake-applying position "$P_2$".

The unique shape of the brake band 18 keeps the brake band 18 suspended across the wheel 16. Specifically, the brake band 18 includes upturned ends 50 and 52, and a central portion 54, upon which the first and second braking surfaces 36 and 38 are carried. The upturned ends 50 and 52 are carried by the support 12 and suspend the brake band 18 on the support 12. Each upturned end 50 and 52 extends outwardly away at a first angle "$\theta_1$" from the brake band 18. A tab 56 is formed on each of the ends 50 and 52 and extends outwardly away at a second angle "$\theta_2$" therefrom.

The support 12 includes a housing 60 within which the first and second braking surfaces 36 and 38 are received. The housing 60 has opposed sidewalls 62 between which the brake band 18 is captured. This causes the central portion 54 to assume a bowed shape, which in turn biases the first and second braking surfaces 36 and 38 toward the interior surface 44 of the shoulder 34 regardless of the position of the interior surface 36 relative to the brake band 18. The support 12 also includes slots 64. Each slot 64 is positioned on one of the sidewalls 62 and receives one of the tabs 56 to maintain the brake band 18 within the housing 60.

The actuator 20 releasably locks the brake band 18 against the wheel 16 in either of the first and second brake-applying positions "$P_1$" and "$P_2$" by pivoting relative to the axle 16. Specifically, to place the actuator 20 in the first brake-applying position "$P_1$", a downwardly-directed force "$F_1$" is applied to the first lever portion 30 of the pedal 28, which causes the distal end 26 of pivot arm 22 to move in a clockwise direction around the axle 14. The clockwise pivotal movement of the pivot arm 22 generates a tangential force "$T_1$" applied by the interior surface 44 on the first braking surface 36 and associated detent 46. This in turn causes a shear deformation of the brake band 18, in which the first braking surface 42 moves away from the end 52 and engages the interior surface 36 in the first braking position "$P_1$".

To move the actuator 20 to the second braking position "$P_2$", a downwardly directed force "$F_2$" is applied to the second lever portion 32 of the pedal 28. This moves the distal end 26 of the pivot arm 22 in a counterclockwise direction around the axle 14. This counterclockwise pivotal movement generates a tangential force "$T_2$" applied by the interior surface 44 on the second braking surface 38. When the interior surface 36 frictionally engages the second braking surface 38 and associated detent 48, a shear deformation of the brake band 18 occurs, whereby the second braking surface 38 moves away from the end 50 and engages the interior surface 36 in the second braking position "$P_2$".

Figure 5:
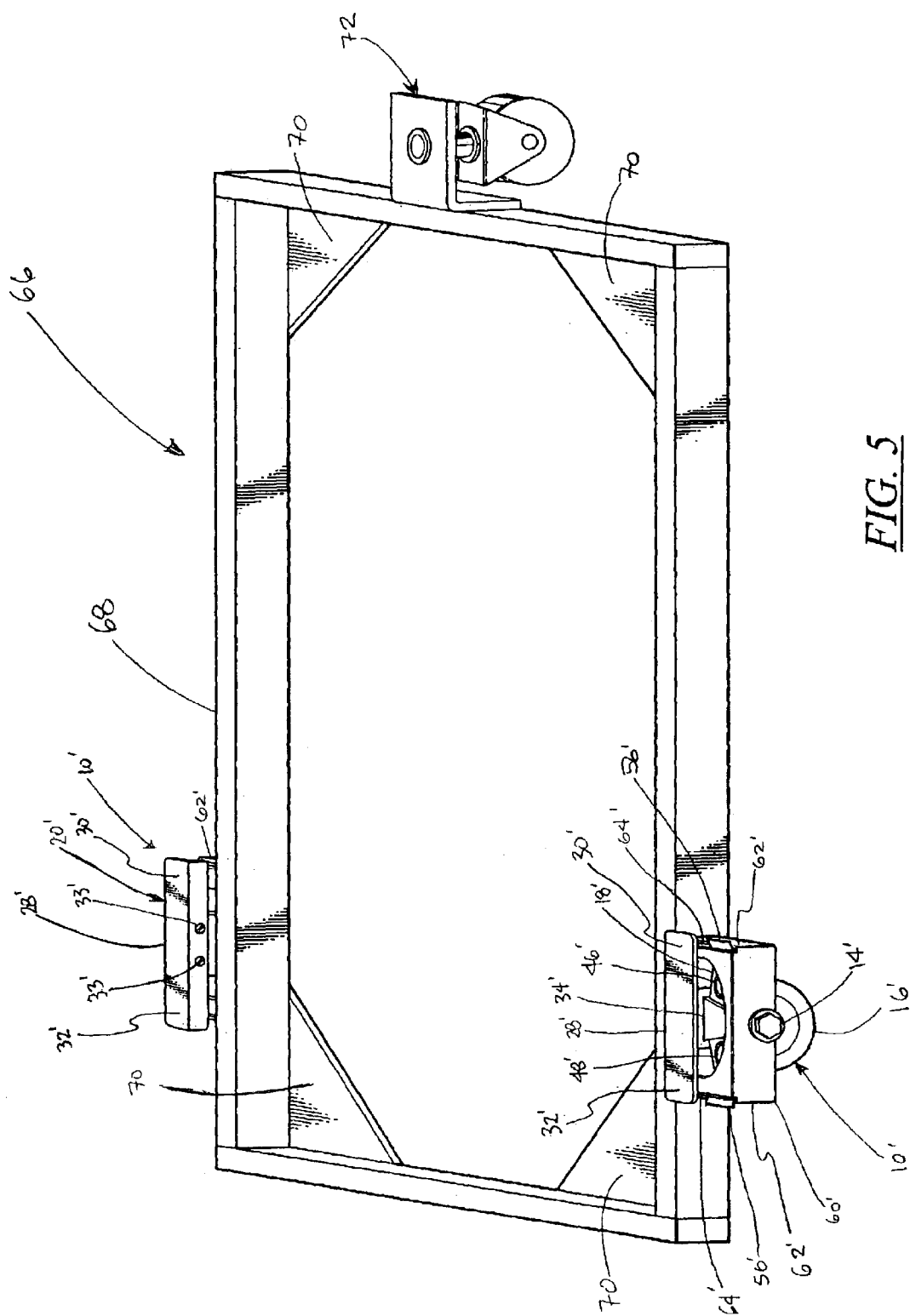
FIG. 5 is a perspective view of two brake and wheel assemblies according to the present invention in use on a low-profile cart.

Although the brake and wheel assembly 10 is suitable for use on any mobile cart or other vehicle, the assembly 10 is shown in FIG. 5 in use on a low-profile cart 66. The cart 66 includes a frame 68 for receiving and supporting an article. The frame 68 is reinforced and stabilized by four gussets 70. Two spaced brake and wheel assemblies 10' are carried by the frame 68. In addition, a caster wheel 72 is mounted on the frame 68 in spaced relation to the assemblies 10, and is used to steer the cart 68 when the cart 68 is moved across a floor.

Because each wheel and brake assembly 10 on the cart 68 includes the same components and functions in the same manner as the wheel and brake assembly 10 set forth above, like components are indicated using prime reference numerals. In particular, a housing 60' is carried by the frame 68, and includes opposed sidewalls 62' with slots 64'. An axle 14' supports the housing 60' and extends outwardly away at an angle from the frame 68. A wheel 16' is rotatably supported on the axle 14' and is received with the housing 60'.

The assembly 10' also includes a brake band 18' having opposed free ends with tabs 56' received within the slots 64' for suspending the brake band 18' tangentially across the wheel 16'. Spaced detents 46' and 48' extend from the brake band 18' away from the wheel 16'. An actuator 20' has a proximal end 24' for pivotally connecting the actuator 20' to the assembly 10', and a distal end 26' that extends radially from the proximal end 24'. A pedal 28' is connected to the distal end 26', and a shoulder 34' is connected to the actuator 20' between the proximal end 24' and the pedal 28'. The pedal 28' receives a downwardly-directed force and causes the actuator 20' to pivot, whereby the shoulder 34' moves through an arc relative to the wheel 16' and frictionally engages each of the detents 46' and 48' in a selected one of two brake-applying positions to inhibit movement of the wheel 16'.

Obviously, many modifications and variations of the present invention are possible in light of the above teachings. The invention may be practiced otherwise than as specifically described within the scope of the appended claims. The foregoing description of the invention is provided for the purpose of illustration only and not for the purpose of limitation—the invention being defined by the claims.

What is claimed is:

1. A brake and a wheel assembly comprising;
   a support,
   an axle supported by said support,
   a wheel rotatably supported on said axle,
   a brake band supported by said support tangentially across the wheel, and
   an actuator movably supported in said assembly for movement between first and second brake-applying positions to engage said brake band with the wheel in either of said first or second brake-applying positions.

2. A brake and wheel assembly according to claim 1 wherein said brake band includes a first braking surface interposed between said actuator and the wheel to engage said actuator in said first brake-applying position.

3. A brake and wheel assembly according to claim 2 wherein said brake band includes a second braking surface interposed between said actuator and the wheel in spaced relation to said first braking surface for engaging said actuator in said second brake-applying position.

4. A brake and wheel assembly according to claim 3 wherein said actuator includes a pivot arm having a proximal end for pivotally connecting said actuator for pivotal movement relative thereto and a distal end extending radially from said proximal end thereof, a pedal carried by said distal end for moving said actuator between said first and second brake-applying positions.

5. A brake and wheel assembly according to claim 4 wherein said actuator includes a shoulder having first and second opposing ends, said shoulder connected to said pivot arm between said pedal and said proximal end for selectively engaging said first and second braking surfaces.

6. A brake and wheel assembly according to claim 5 wherein said brake band is interposed between said shoulder and the wheel, said shoulder including an interior surface extending between said first and second opposing ends for engaging said brake band in either of said first or second brake-applying positions.

7. A brake and wheel assembly according to claim 6 wherein said second braking surface includes a detent extending from said brake band toward said shoulder for engaging said interior surface of said shoulder adjacent said second end.

8. A brake and wheel assembly according to claim 6 wherein said first braking surface includes a detent extending from said brake band toward the shoulder for engaging said interior surface of said shoulder adjacent said first end.

9. A brake and wheel assembly according to claim 5 wherein said shoulder extends transversely away from said pivot arm at a generally perpendicular angle thereto.

10. A brake and wheel assembly according to claim 4 wherein said pedal includes a first lever portion extending transversely away from said pivot arm at a generally perpendicular angle thereto for receiving a downwardly-directed force to initiate clockwise pivotal movement of said pivot arm relative to the axle for moving said actuator to said first brake-applying position.

11. A brake and wheel assembly according to claim 10 wherein said pedal includes a second lever portion extending transversely away from said pivot arm at a generally perpendicular angle thereto for receiving a downwardly-directed force to initiate counterclockwise pivotal movement of said pivot arm relative to said axle for moving said actuator to said second brake-applying position.

12. A brake and wheel assembly according to claim 11 wherein said distal end is connected to said pedal intermediate said first and second lever portions.

13. A brake and wheel assembly according to claim 12 wherein said brake band includes opposed upturned ends carried by said support and extending outwardly away at a first angle for suspending said brake band on said support.

14. A brake and wheel assembly according to claim 13 wherein said support includes slots, each of said upturned ends including a tab extending outwardly away at a second angle for being positioned in one of said slots to maintain said brake band within said housing.

15. A brake and wheel assembly according to claim 14 wherein said support includes a housing for receiving said first and second braking surfaces therein, said housing having opposed sidewalls between which said brake band is captured, whereby said first and second braking surfaces are continually biased toward said interior surface of said shoulder.

16. A brake and wheel assembly according to claim 15 wherein said brake band includes a central portion carrying said first and second braking surfaces, wherein application of said downwardly directed force on said first lever portion of said pedal and the resulting clockwise pivotal movement of said pivot arm generates a tangential force applied by said interior surface on said first braking surface, whereby a shear deformation of said brake band occurs wherein said first braking surface moves away from said end and engages said interior surface in said first braking position.

17. A brake and wheel assembly according to claim 15 wherein said brake includes a central portion carrying said first and second braking surfaces, wherein application of said downwardly directed force on said second lever portion of said pedal and the resulting counterclockwise pivotal movement of said pivot arm generates a tangential force applied by said interior surface on said second braking surface, whereby a shear deformation of said brake band occurs wherein said second braking surface moves away from said end and engages said interior surface in said second braking position.

18. A cart for transporting an article comprising;
   a frame for receiving and supporting the article,
   a plurality of spaced brake and wheel assemblies carried by said frame, each of said brake and wheel assemblies including
   a housing carried by said frame and having opposed sidewalls defining slots,
   an axle supporting said frame and extending outwardly away at an angle therefrom,
   a wheel rotatably supported on said axle and received within said housing,
   a brake band having opposed free ends received within said slots for suspending said brake band tangentially across said wheel and spaced detents extending from said brake band away from said wheel, and
   an actuator having a proximal end carried by said frame for pivotal movement relative to said axle, a distal end extending radially from said proximal end, a pedal connected to said distal end, and a shoulder connected to said actuator between said proximal end and said pedal, said pedal for receiving a downwardly-directed force to initiate pivotal movement of said actuator, whereby said shoulder moves through an arc relative to said wheel and frictionally engages each of said detents in a selected one of two brake-applying positions.

* * * * *